(No Model.) 2 Sheets—Sheet 1.
W. S. REEDER.
MACHINE FOR RECEIVING, CLEANING, AND DISTRIBUTING SEED COTTON.
No. 506,728. Patented Oct. 17, 1893.
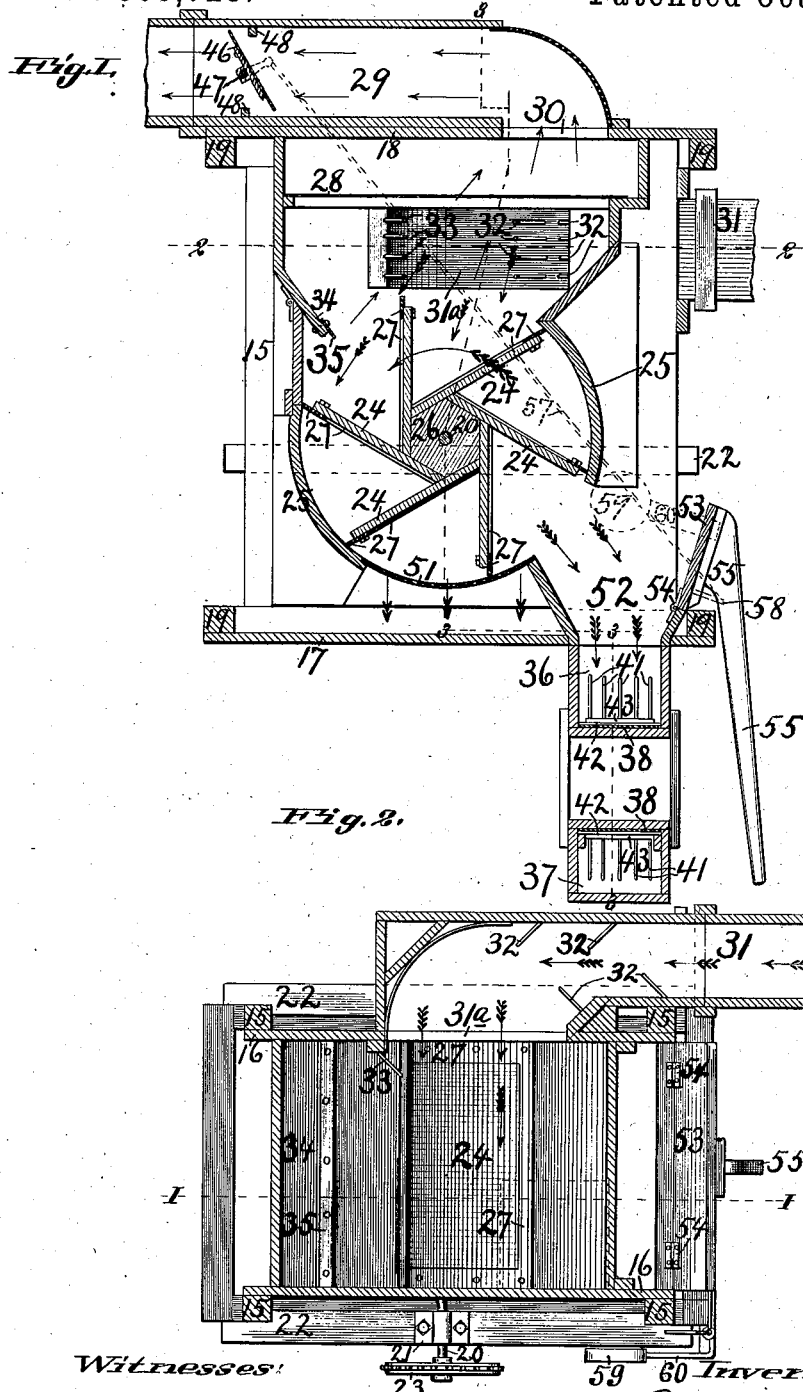
Witnesses:
Geo. L. Neuhoff
Charles Pickles
Inventor:
Wm. S. Reeder,
By Fowler & Fowler
Attorneys

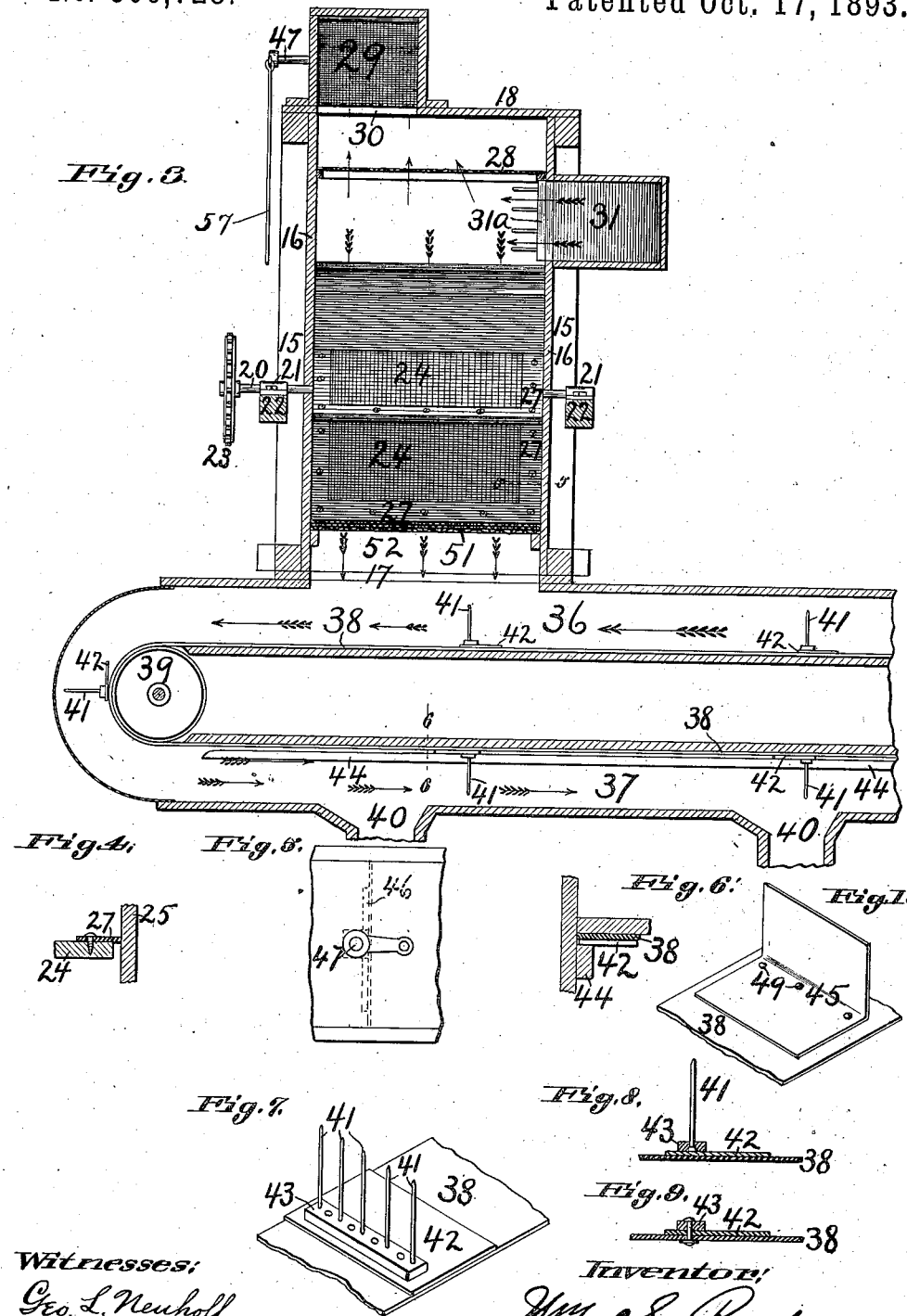

UNITED STATES PATENT OFFICE.

WILLIAM S. REEDER, OF ST. LOUIS, MISSOURI, ASSIGNOR TO THE KINGSLAND & DOUGLAS MANUFACTURING COMPANY, OF SAME PLACE.

MACHINE FOR RECEIVING, CLEANING, AND DISTRIBUTING SEED-COTTON.

SPECIFICATION forming part of Letters Patent No. 506,728, dated October 17, 1893.

Application filed August 20, 1892. Serial No. 443,573. (No model.)

*To all whom it may concern:*

Be it known that I, WILLIAM S. REEDER, a citizen of the United States, residing at St. Louis, in the State of Missouri, have invented a certain new and useful Machine for Receiving, Cleaning, and Distributing Seed-Cotton, of which the following is such a full, clear, and exact description as will enable any one skilled in the art to which it appertains to make and use the same, reference being had to the accompanying drawings, forming part of this specification.

The main objects of my invention are, first, to prevent the machine from being clogged, and to disintegrate such wads of cotton as might tend to clog the same; second, to separate more effectually the dirt, dust and trash contained in the seed cotton, and, third, to provide a cheap and simple endless conveying appliance not likely to be torn or injured, or to drag at the bottom of the trunk wherein it moves.

To prevent clogging of the machine I provide certain spikes, suitably arranged within the trunk through which the cotton enters the machine, and I arrange the opening of said trunk into the machine, and the opening of the exhaust-pipe for creating the required suction for drawing cotton into the machine, in such a position relative to each other that the cotton is fed uniformly into the buckets or valves hereinafter described.

To separate more completely the dirt and trash from the cotton, I provide, in addition to the screen usually employed in pneumatic cotton receivers, a second screen over which the cotton is moved before being discharged from the machine.

To prevent dragging of the cotton-conveying belt, I provide the trunk in which the lower or returning portion of said belt moves, with lateral flanges or projections on which said belt is adapted to ride, as hereinafter more fully explained.

The invention embraces besides the above features, certain details of construction to be hereinafter more fully described.

Said invention will be best understood by referring to the accompanying drawings, in which like marks of reference indicate like parts throughout the several views.

Figure 1 is a vertical sectional view of a machine provided with my improvements, on the plane of line 1—1 of Fig. 2. Fig. 2 is a sectional top view of such machine on the plane of line 2—2 of Fig. 1. Fig. 3 is a vertical sectional view of such machine on the plane indicated by the broken line 3—3 in Fig. 1, the wings, valves or buckets above referred to being shown in elevation. The remaining views are details on an enlarged scale. Fig. 4 is a sectional view of the edge of one of said wings or valves, provided with a suitable strip of leather or other flexible material. Fig. 5 is a view of means for controlling the draft. Fig. 6 is a cross sectional view of a device for preventing dragging of the conveying-belt. Fig. 7 is a preferred form of attachment for securing the spikes to the conveying-belt. Fig. 8 is a longitudinal sectional view of said spiked belt on a plane passing through one of the spikes. Fig. 9 is a longitudinal sectional view of said belt on a plane midway between two spikes. Fig. 10 is a view of an angle-iron attachment which may be used in place of spikes upon the conveying-belt.

In the figures the direction in which the cotton passes into and through the machine is indicated by small feathered arrows, and the direction of the current of air by arrows with no feather.

The frame of that part of the machine which receives and cleans the cotton, consists preferably of four uprights 15 (Fig. 2), to which are secured the vertical front and rear walls 16 of the machine. The bottom 17 and top 18 are secured to cross-pieces 19 (Fig. 1) suitably connected to the frame of the machine. Preferably somewhat below the middle of this frame, and passing horizontally at right-angles through the front and rear walls 16, is a shaft 20 whose ends are suitably journaled in brackets 21 carried upon horizontal cross timbers 22. On this shaft is rigidly mounted a driving wheel 23 outside of the machine, and the rotating wings or valves 24 within the machine and extending preferably from wall to wall across the entire machine, and preferably secured to a suitable hub 26 instead of being fastened directly to the shaft 20. Said shaft and wings may be rotated in the direction of the larger feathered arrow (Fig. 1). The valves or wings 24 rotate within a horizontal drum 25 (Fig. 1) and constitute a pocket valve, forming substantially an air-tight connection with the peripheral walls and with the heads of said drum by means of strips 27 of leather or other flexible material attached to and projecting slightly beyond the three edges of each wing. I prefer to arrange the wings 24 of the pocket valve as shown in Fig. 1, where instead of extending radially from the center of rotation they are mounted obliquely, for example by being attached substantially tangent to the hub 26 which hub is rigidly mounted on the shaft 20. The shaft being rotated as indicated by the large feathered arrow (Fig 1) it will be seen that any resisting body when struck by one of the advancing wings is impelled outwardly instead of being scooped into the pockets of the valve (as would be the case if the wings were rotated in the opposite direction) or being simply impelled parallel to the motion of the impelling wing (as would be the case if the wings were mounted radially instead of obliquely or tangentially). With this construction the discharge of cotton from the valve is more free and there is less danger of clogging than with the radially mounted wings heretofore employed.

The heads of the drum 25 may be formed by the vertical front and rear walls 16 of the machine. The peripheral wall of said drum is broken away across the entire length of the drum at its top, and at its bottom, leaving, however, on either side, a portion of said wall having a width greater than the distance between two successive wings 24, so that when the wings are rotated they make continually a substantially air-tight connection with the walls and heads of said drum on all sides, whereby air communication between the space below and the space above said drum is cut off. The space between the drum 25 and the top 18 constitutes the receiving-chamber, and is divided by a horizontal screen 28 (Fig. 1). The exhaust-pipe 29 (Fig. 1) communicates with the receiving-chamber above said screen through an opening 30, which opening is preferably placed, say at the front and to the right-hand side of the upper wall 18 of the machine, as indicated by dotted lines in Fig. 2. The air in the upper portion of the receiving-chamber is exhausted through said pipe 29 by the usual fan or other suitable device, not shown in the drawings, whereby the seed cotton is sucked into the receiving-chamber, from a wagon or bin through the trunk 31 (Figs. 1, 2, and 3), which trunk communicates with said receiving-chamber, preferably by an opening 31ª in the rear wall 16, intermediate the screen 28 and the pocket-valve. The purpose of placing the openings 30 and 31ª as just described, will be explained hereinafter.

The trunk 31 is provided with spikes 32 projecting inwardly and preferably arranged in rows alternately on opposite walls of said trunk (Figs. 1 and 2) and being turned more or less obliquely in the direction in which the cotton passes through the trunk. These spikes pass the cotton alternately from side to side of the trunk, each successive spike serving in some measure to disintegrate any wads that may have been formed in the cotton. Along one side of the opening through which the trunk 31 communicates with the receiving-chamber may be placed a row of oblique spikes 33 (Figs. 1 and 2) similar to the spikes 32, and projecting obliquely toward the middle portion of the receiving-chamber. I prefer, for example, to have the trunk 31 approach horizontally from the right-hand side of the machine, (Fig. 2) then turn at right angles and open into the rear wall of the machine (Fig. 1), the spikes 33 being arranged on the left-hand side of this opening, and the wings or valves 24 being adapted in this case to turn from right to left (Fig. 1) at the top where the cotton is fed to them. The tendency of the spikes 33 working in combination with the suction of air, will, in this event, be to deposit the cotton into the pockets of the valve before the same have moved to the left-hand side of the receiving-chamber, whereby the cotton, before said pockets come in contact with the walls of the drum, will have settled sufficiently in said pockets to prevent being jammed between the wings 24 and said walls.

The relative position and arrangement of the openings 30 and 31ª hereinbefore described, by creating a draft transversely across the top of the receiving-chamber tends to deposit the cotton uniformly along the length of each bucket and tends thereby to prevent clogging or jamming of the cotton between the wall of the drum and the wings 24. The lower part of the receiving chamber preferably has its side walls converging somewhat toward the upper opening in the drum, forming a sort of hopper to help in delivering the cotton to the buckets or valves, (Fig. 1.) The wall of the receiving-chamber toward which the upper wings of the bucket valve move, is preferably provided with a downwardly and inwardly projecting ledge or lip 34, provided at its edge with a projecting strip 35 of leather or other flexible material, against which ledge the flexible ends of the wings 24 come successively as said wings rotate. Adjacent to the ledge or lip 34 I prefer to have the peripheral wall of the drum 25 receding out of the range of the wings 24, as shown in Fig. 1, so that the wings first engage the ledge 34 and after passing the same, move on some little distance before engaging the peripheral wall of the drum 25. Any wad of cotton getting between the wings 24 and the lip 34 will not be likely to choke the machine because the edges of the lip and wings, both being flexible, will yield slightly so that the wads need not be literally cut in two to permit the wings to pass the said lip and the wads will at the same time be more or less disintegrated.

Again, any wad or part of such wad that may get past the lip will have time before the wing comes in engagement with the peripheral wall of the drum, to drop into the pocket or space between two wings, and will not be jammed between the said wing and said wall.

36 and 37 (Figs. 1 and 3) are the upper and lower distributing-trunks in which travels an endless belt 38 working over and actuated by suitable belt pulleys 39, and conveying the cotton discharge from the pockets, or valves 24 to the mouths 40 of chutes leading to gins, gin-feeders or storing rooms or other places. The cotton is carried along by said belt by help of spikes 41, or other suitable means attached to and traveling with the belt.

I prefer when using spikes, to mount them in rows as follows: I place at suitable intervals across the outer surface of the belt, rigid plates 42 preferably of the same width as the belt. The spikes 41 are inserted in or driven through bars 43, each bar bearing a row of spikes arranged like the teeth of a rake, the heads of the spikes being embedded in depressions in the under surface of the bar (Fig. 8). The bars are placed transversely across the belt one upon each of the plates 42 near that edge of the plate which will be advanced when the belt is at work. The bar 43, plate 42 and belt are then riveted together, preferably by a row of rivets inserted respectively midway between the respective spikes 41 (Figs. 7 and 9). In this manner the spikes are securely held in place, and any force tending to turn them out of a position perpendicular to the belt is exerted mainly on the bar 42 and plate 43, instead of tending to pull the heads of the spikes through the belt, as would be the case if the spikes were themselves riveted directly to the belt. Being riveted to the belt by a single row of rivets extending transversely across the belt, the plates do not interfere with the flexure of the belt in passing over the pulleys 39 from the upper to the lower trunk and vice versa, (Fig. 3.)

Sagging of the belt in the lower trunk is prevented by strips 44 (Figs. 3 and 6) which are secured to opposite walls of the lower trunk 37 and extend parallel with and slightly below the position in which the belt is to be kept. The ends of the plates 42 nearest the edges of the belt ride upon these strips 44 and keep the belt in the desired position, the bars 43 being of such length as to leave the lateral edges of the plates 42 free to ride upon said strips, as clearly shown in Fig. 7. Plates 42 may likewise be cut away, belt 38 riding on strips 44.

Instead of spikes 41 I may use a simple angle plate 45 (Fig. 10) of a width somewhat less than that of the belt, and secured to the outer surface of such belt by a transverse row of rivets 49 inserted near the bend or angle of said plate 45. Either the belt itself, or a suitable plate like the plate 42 inserted between the belt and angle plate 45, may in this modification be made to ride upon the strips 44 to prevent sagging of the belt in the lower trunk 37.

The draft of air which feeds cotton into the receiving-chamber may be controlled by a valve 46 (Figs. 1 and 5) hinged on the shaft 47 in the trunk 29, and adapted, when closed, to rest against the stops 48 (Fig. 1). This valve may be operated in any suitable manner to control the draft.

At the bottom of the drum 25, and at that part thereof over which the cotton is swept by the wings 24, just before being discharged from the drum, is a screen 51 (Fig. 1). It is found that the coarser impurities, gravel, sand, &c., are not separated from the cotton by the draft of air through the same, which draft, however, usually carries the dust and finer impurities through the screen interposed between the exhaust-pipe and the cotton in the receiving-chamber. As the cotton in the valves is swept over the screen 51, these coarser impurities drop through said screen (as indicated by doubly barbed arrows in Fig. 1) instead of remaining in the cotton as heretofore.

A suitable chute 52 may be used to guide the cotton discharged from the valves 24 into the upper trunk 36 of the conveying apparatus hereinbefore described. One side 53 of this chute is preferably hinged at 54, and is provided with an arm 55, by means of which the chute may be opened when desired, to see whether too much cotton has been fed to the machine, and in order that the choking of the apparatus may be prevented by removing such excess of cotton.

The shut-off valve 46 which controls the draft of air by which cotton is sucked into the receiving chamber may be connected with the hinged side 53 of the chute 52, for example in the manner shown in Fig. 1 where one end of a connecting-rod 57 is pivoted to the crank which opens and closes said valve 46, the other end of said rod being pivoted to a link 58 attached at some convenient point to the said hinged wall 53. With this arrangement, when the hinged wall 53 is opened, or is swung outwardly by means of the arm 55, the valve 46 moves toward the stops 48, shutting off the draft in the trunk 29, either partly or completely, according to the extent to which said hinged wall 53 is moved.

A weight 59 may be attached to the hinged wall 53 by a suitable arm 60, (Figs. 1 and 2.) This weight tends normally to close the hinged door 53, thereby opening the valve 46 and permitting the draft of air to feed the machine in a normal manner. When more cotton is discharged from the valve than can be conveyed away by the belt, an excess of cotton will accumulate in the chute 52 and will be packed therein by the successive discharges of the pockets of the rotating pocket-valve. This cotton pressing against the hinged wall 53 will move the same outwardly, whereby the valve 46 will be partly or entirely closed by means of the connecting-rod 57. In this manner the draft of air in the feeding trunk is suitably diminished to prevent choking of the machine. When the excess of cotton in the chute 52 has been carried away, the weight 59 will move the wall 53 back to its normal position, thereby automatically opening valve 46 and restoring the normal rate of feed.

The operation of my machine is as follows: A draft of air is created through the trunk 31 which leads to the wagon bin or hopper containing the seed cotton to be cleaned and distributed. This draft is preferably created by sucking the air out of the receiving-chamber through the trunk 29 by means of the usual fan (not shown in the drawings). The cotton is thus carried through the trunk 31 into the receiving-chamber, the wads being combed or disintegrated by spikes 32. The cotton then drops into the buckets, that is, between the wings 24 of the pocket-valve which is rotated in the direction of the large feathered arrow as aforesaid, the dust and lighter impurities being carried away by the draft of air through the trunk 29, the screen 28 preventing the cotton from being also carried out by said draft. The wings 24 carry the cotton down in the drum 25 sweeping it over the screen 51 where the coarser impurities drop out, and then discharging the cleansed cotton through the chute 52 into the upper trunk 36 of the conveying apparatus, or other receptacle if the conveyer is not used. The belt by help of the spikes 41 or angle-plates 45 carries the cotton to the openings 40 through which the cotton drops into the gin-feeders, bins or other suitable places. Should more cotton be discharged from the pocket valve than the openings 40 will receive, or than the distributer will convey away the feed will be automatically moderated or stopped as hereinbefore explained and will automatically be restored when the excess of cotton has been removed from the chute 52 by the conveying belt or by the operator. I prefer also to provide an additional safeguard against choking of the machine, consisting in the automatic discharge of cotton from the chute 52 via the opening normally closed partly or entirely by the hinged wall 53. This is accomplished by so mounting said hinged wall that an excess of cotton accumulating in the chute 52 will push the wall or door open sufficiently to permit some of the cotton to be pushed out as the successive discharges of cotton from the pockets of the rotating valve take place. The excess having been discharged, the weight 59 will automatically restore the hinged wall 53 to its normal position.

The hinged wall is preferably somewhat shorter than the remaining walls of the chute so that when closed, there is still an opening in the chute just above the said hinged wall. If the cotton rises to the top of the chute owing for example to failure of the distributer to convey it away as fast as discharged from the receiver, some of the cotton will automatically be thrown or will drop out of said opening and if this discharge of cotton is not sufficient to remove the excess the cotton will pack in the chute forcing open the hinged wall 53 and will be discharged from the enlarged opening thus afforded as aforesaid.

Having fully described my invention, what I desire to claim and secure by Letters Patent of the United States is—

1. In a pneumatic apparatus for handling cotton the combination of a cotton distributer adapted to have cotton pass therefrom through a plurality of openings leading to different receptacles a cotton receiver, discharging mechanism for delivering cotton from the receiver to the distributer, and automatic regulating mechanism governed by the cotton passing from the receiver to the distributer and controlling the draft of air by which cotton is fed to the receiver.

2. In a pneumatic apparatus for handling cotton the combination of a distributer adapted to have cotton pass therefrom through a plurality of openings, a cotton receiver, a valve mechanism for discharging cotton from the receiver and cutting off air communication between the receiver and the discharge opening, a chute through which the cotton passes from the discharge opening to the distributer said chute having a swinging side, a damper controlling the draft of air by which cotton is fed to the machine, and connecting mechanism between said swinging side of the chute and the damper whereby the draft of air is controlled by the cotton in said chute.

3. In an apparatus for handling cotton the combination of a cotton receiver having means for discharging the cotton therefrom, a chute through which said cotton passes when discharged and having a suitably mounted side adapted to be opened automatically by an excess of cotton accumulating in said chute, and a cotton distributer into which the cotton normally passes through said chute.

4. In an apparatus for handling cotton, the combination of a cotton receiver having means for discharging the cotton therefrom, a chute through which said cotton passes when so discharged and having a suitably mounted side adapted to be opened automatically by an excess of cotton accumulating in said chute, and means tending to return said side to its normal position.

5. The combination with a cotton receiver, of a cotton conveyer, a chute through which the cotton passes, said chute having a swinging side, an arm within convenient reach of the operator for manipulating said swinging side of the said chute, and connecting mechanism between the swinging side and the feeding devices, whereby when said side is swung open the feed of the cotton through the cotton conveyer will be suitably moderated.

6. The combination with a cotton receiver, of a cotton-conveyer, a chute through which the cotton passes, discharging mechanism for delivering the cotton from the receiver to said chute, a swinging side for said chute, an arm within convenient reach of the operator for manipulating said swinging side, suitable connections between the swinging side and the cotton-conveyer, whereby when said side is swung upon either automatically by the pressure of the cotton, or by the operator the quantity of cotton passing through the conveyer will be suitably lessened, and automatic means tending to return said swinging side to its normal position.

7. In a cotton handling apparatus the combination of a receiving chamber, mechanism for discharging the cotton from said receiving-chamber, a chute into which the cotton passes when so discharged, a lateral opening in the chute some distance above the bottom thereon, and an opening at the bottom of the chute through which the cotton normally passes, whereby when too much cotton is discharged from the receiving-chamber the excess of cotton will leave the chute via the said lateral opening.

8. In an apparatus for handling cotton, a trunk through which the cotton is moved by a draft of air, and suitably arranged spikes on the inner walls of said trunk, for the purpose set forth.

9. In an apparatus for handling cotton, a trunk through which the cotton is moved by a draft of air, and spikes suitably arranged in rows alternately on opposite walls of said trunk for the purpose set forth.

10. In a pneumatic cotton handling apparatus, a receiving-chamber, means for discharging the cotton from the receiving-chamber and cutting off air communication between the discharge opening and the said chamber, a trunk through which the cotton is pneumatically fed into the said chamber, and spikes along the mouth of said trunk for directing the cotton to the discharging means.

11. In a pneumatic cotton receiver, a receiving-chamber, a pocket-valve for discharging the cotton and cutting off air communication between the discharge opening and the said chamber, a trunk through which the cotton is pneumatically fed to the receiving-chamber, and spikes along the mouth of the trunk and turned toward the said pocket-valve and more or less contrary to the direction in which the pockets of said valve move while being filled.

12. In a cotton conveying appliance an endless belt or apron, spikes suitably fastened to cross bars, rigid plates between each cross-bar and the belt, and suitable fastenings holding said parts together, the fastenings being arranged in lines extending transversely across the belt or apron, there being one such line for each of said rigid plates.

In testimony whereof I have hereunto set my hand and affixed my seal, this 11th day of August, 1892, in the presence of the two subscribing witnesses.

WILLIAM S. REEDER. [L. S.]

Witnesses:
A. C. FOWLER,
GEO. L. NEUHOFF.